United States Patent
Tian et al.

(10) Patent No.: US 10,197,901 B2
(45) Date of Patent: Feb. 5, 2019

(54) DUAL-COLOR LASER LIGHT SOURCE

(71) Applicants: Hisense Co., Ltd., Qingdao (CN); Hisense International Co., Ltd., Qingdao (CN); HISENSE USA CORP., Suwanee, GA (US)

(72) Inventors: Youliang Tian, Qingdao (CN); Xianrong Liu, Qingdao (CN); Wei Li, Qingdao (CN)

(73) Assignees: Hisense Co., Ltd., Qingdao, Shandong (CN); Hisense International Co., Ltd., Qingdao, Shandong (CN); Hisense USA Corp., Suwanee, GA (US)

(*) Notice: Subject to any disclaimer, the term of this patent is extended or adjusted under 35 U.S.C. 154(b) by 0 days.

(21) Appl. No.: 15/895,803

(22) Filed: Feb. 13, 2018

(65) Prior Publication Data

US 2018/0224732 A1 Aug. 9, 2018

Related U.S. Application Data

(63) Continuation of application No. PCT/CN2015/088940, filed on Sep. 6, 2015.

(30) Foreign Application Priority Data

Jun. 3, 2015 (CN) .......................... 2015 1 0298318

(51) Int. Cl.
*G03B 21/14* (2006.01)
*H04N 9/31* (2006.01)
(Continued)

(52) U.S. Cl.
CPC .......... *G03B 21/208* (2013.01); *G02B 27/48* (2013.01); *G03B 21/20* (2013.01); *G03B 21/204* (2013.01);
(Continued)

(58) Field of Classification Search
CPC .... G03B 21/14; G03B 21/204; G03B 21/208; G03B 21/2013; G03B 21/2066;
(Continued)

(56) References Cited

U.S. PATENT DOCUMENTS

2006/0092515 A1 5/2006 Kim et al.
2006/0126184 A1 6/2006 Kim et al.
(Continued)

FOREIGN PATENT DOCUMENTS

CN 1790094 A 6/2006
CN 201378244 Y 1/2010
(Continued)

OTHER PUBLICATIONS

International Preliminary Report on Patentability for International Application No. PCT/CN2015/088940 dated Dec. 5, 2017; 5 pages.
(Continued)

*Primary Examiner* — William C Dowling
(74) *Attorney, Agent, or Firm* — Brinks Gilson & Lione (57) ABSTRACT

Methods and apparatuses that provide a technical solution for handling a microphone operation request from more than one application is disclosed. The technical solution for processing data obtained by a microphone of a terminal device includes receiving an audio recording start command sent by a second application running on the terminal while the microphone is being used by a first application running on the terminal. The technical solution further includes assigning an unoccupied data receiving port to the second application, acquiring and broadcasting audio recording data collected by the microphone through a data sending port, receiving the audio recording data by the assigned data receiving port, and sending the audio recording data to the second application by the assigned data receiving port.

20 Claims, 6 Drawing Sheets

(51) Int. Cl.
  *G03B 21/20* (2006.01)
  *G02B 27/48* (2006.01)
(52) U.S. Cl.
  CPC ..... *G03B 21/2013* (2013.01); *G03B 21/2066* (2013.01); *H04N 9/3152* (2013.01)
(58) Field of Classification Search
  CPC ...... H04N 9/31; H04N 9/3152; H04N 9/3161; H04N 9/3164; G02B 27/10; G02B 27/18; G02B 27/1006; G02B 27/1053
  See application file for complete search history.

(56) References Cited

U.S. PATENT DOCUMENTS

| | | | |
|---|---|---|---|
| 2012/0086917 | A1 | 4/2012 | Okuda et al. |
| 2012/0229780 | A1 | 9/2012 | Sato |
| 2013/0100417 | A1 | 4/2013 | Yang et al. |
| 2013/0229628 | A1 | 9/2013 | Akiyama et al. |
| 2014/0071182 | A1 | 3/2014 | Takahashi et al. |
| 2017/0157050 | A1* | 6/2017 | Teng .................. A61K 47/34 |
| 2018/0136549 | A1* | 5/2018 | Tian .................. G02B 5/0278 |
| 2018/0157050 | A1* | 6/2018 | Liao .................. G02B 27/10 |
| 2018/0164669 | A1* | 6/2018 | Tian .................. G02B 27/18 |

FOREIGN PATENT DOCUMENTS

| | | |
|---|---|---|
| CN | 102472955 A | 5/2012 |
| CN | 102608855 A | 7/2012 |
| CN | 102681320 A | 9/2012 |
| CN | 103062672 A | 4/2013 |
| CN | 103676428 A | 3/2014 |
| CN | 103777365 A | 5/2014 |
| CN | 203745788 U | 7/2014 |
| CN | 203745789 U | 7/2014 |
| CN | 203786412 U | 8/2014 |
| CN | 204009242 U | 12/2014 |
| CN | 105093794 A | 11/2015 |
| CN | 105093795 A | 11/2015 |
| JP | 2008-134269 | 6/2008 |

OTHER PUBLICATIONS

International Search Report for International Application No. PCT/CN2015/088940 dated Mar. 9, 2016; 6 pages.
First Office Action for Chinese Application. No. 201510510056.6; 6 pages.
First Search Report for Chinese Application No. 201510510056.6; 2 pages.
Supplemental Search for Chinese Application No. 201510510056.6; 1 page.
Nth Office Action for Chinese Application No. 201510510056.6; 5 pages.
Written Opinion of International Search Authority for International Application No. PCT/CN2015/088940 dated Mar. 9, 2016; 10 pages.

* cited by examiner

DUAL-COLOR LASER LIGHT SOURCE

CROSS-REFERENCE TO RELATED APPLICATION(S)

This application is a continuation of International Patent Application No. PCT/CN2015/088940, filed on Sep. 6, 2015, which claims priority to Chinese Patent Application No. 201510298318.7, filed Jun. 3, 2015, the entirety of all of which are incorporated by reference herein.

TECHNICAL FIELD

The present disclosure relates to the field of projection display, in particular to a dual-color laser light source and a projection display device.

BACKGROUND

Laser light is a light source emitting monochromatic coherent beams, with high luminance and strong directionality. Owing to the numerous advantages, the laser light has been gradually applied as a light source in the technical field of projection display in recent years. However, because of the high coherence of laser, the speckle effect is inevitable, such phenomenon is especially obvious in the solutions within which a pure laser light is used as the light source, and it also exists in the solutions within which a laser light and a fluorescent light are used, as well as in the solutions within which the mixed light source of a laser light and a LED is used. The speckle refers to the spatial interference of the light after scattering when a coherent light source irradiates on a rough object, and the spatial interference of the light is owing to the same wave length and the constant phase of the light. There will be some constructive spatial interference and some destructive spatial interference, the final result is that alternated light and shade granular spots will appear on the screen, namely, some unfocused spots will flash, it is easy to feel dizzy after watching for long time. And it will undoubtedly result in the quality reduction of projected images to lower the user's experience of watching.

The use of a bicolor laser light source improves the overall luminance of the laser light source to satisfy the need of the luminance in the field of laser projection. However, the speckle problems caused by the laser light itself also will be aggravated, which becomes an obstacle to the popularization and application of the bicolor laser light.

How to reduce the speckle effect of a laser light caused by its inherent qualities at the same time of applying a bicolor laser light source has become a technical problem to be solved.

SUMMARY

According to a first embodiment, the disclosure provides a dual-color laser light source, comprising a blue laser device configured to emit a blue laser light and a red laser device configured to emit a red laser light; a fluorescent wheel whose surface is coated with green fluorescent powder which can be excited by the blue laser light to emit a green fluorescent light; wherein, also comprising a speckle dissipation system, the speckle dissipation system comprises:

a first diffusion element, which is fixedly disposed in the beam shaping optical path(s) of the blue laser light and the red laser light, being used to diffuse the blue laser light and the red laser light;

and a second diffusion element, which is controlled to rotate and disposed before the blue laser light, the red laser light and the green fluorescent light incidenting into a light bar, being used to transmit at least the blue laser light and the red laser light in time sequence and output the blue laser light and the red laser light.

According to another embodiment, the disclosure provides a projection display device comprising a laser light source, a light machine, a lens and a projection screen, wherein the laser light source provides illumination for the light machine, and images are projected to the projection screen by the lens for displaying, and wherein, the laser light source is the laser light source in the above technical solution.

In yet another embodiment, the disclosure provides a projection display device comprising: a blue laser emitter configured to emit a blue laser light; a red laser emitter configured to emit a red laser light; a first diffusion element, which is fixedly disposed in optical path(s) of the blue laser light and the red laser light incidenting into a light merging component; the light merging component configured to transfer the blue laser light to a fluorescent wheel and the red laser light to a second diffusion element; the fluorescent wheel configured to receive the blue laser light and emit a green fluorescent light which is transmitted to the second diffusion element through the light merging component; the second diffusion element, which is controlled to rotate and comprises a non-diffusion zone configured to transmit the green fluorescent light and a diffusion zone configured to transmit the red laser light output by the light merging component.

DETAILED DESCRIPTION

In order to make the objects, technical solutions and advantages of the disclosure clearer, the disclosure will be further described in details below by combining with the drawings. The embodiments described may only represent partial embodiments of the disclosure and not an entirety of an embodiments. Based on the embodiments in the disclosure, all the other embodiments obtained by a person of skill in the art without creative labor are within the protective scope of the disclosure.

Figure 1:
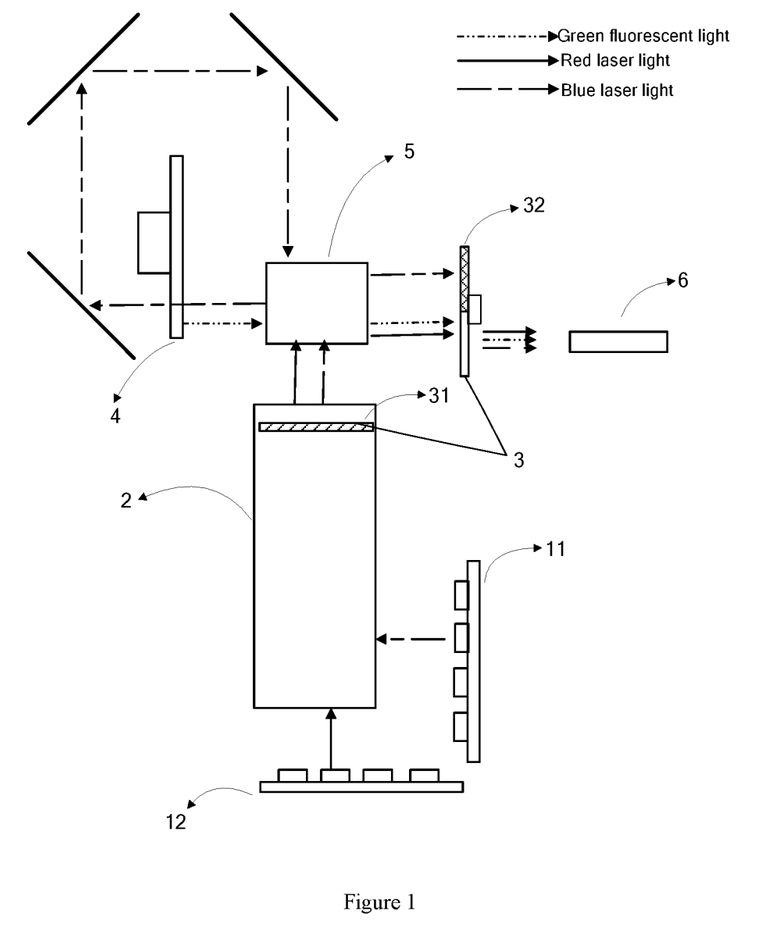
FIG. 1 shows a schematic diagram of a dual-color laser light source in some embodiments of the disclosure.

The embodiments of the disclosure provides a dual-color laser light source. As shown in FIG. 1, the dual-color laser light source comprises a blue laser emitter array 11 configured to emit a blue laser light and a red laser emitter array 12 configured to emit a red laser light, as well as a fluorescent wheel 4, on the surface thereof green fluorescent powder is coated, and the green fluorescent powder can be excited by the blue laser light to emit a green fluorescent light. The blue laser light and the red laser light are shaped by a beam shaping device 2 before entering the fluorescent wheel 4 and a light merging component 5. The beam shaping device 2 comprises the first diffusion element 31 of the speckle dissipation system 3, wherein the first diffusion element 31 is fixedly disposed and in the beam shaping optical path(s) of the blue laser light and the red laser light, and is configured to diffuse the blue laser light and the red laser light. The blue laser light is reflected to the fluorescent wheel 4 by the light merging component 5, and then reach the light merging component 5 again through being transmitted by the fluorescent wheel 4 and a optical path of a relay loop, and at last is reflected to output by the light merging component. The red laser light is reflected by the light merging component 5 and the green fluorescent light is transmitted by the light merging component 5. The second diffusion element 32 is controlled to roated, that is, which is a moving diffusion element. And the second diffusion element 32 is disposed before the blue laser light, the red laser light and the green fluorescent light incidenting into a light bar 6, and is configured to transmit at least the blue laser light and the red laser light in time sequence. The second diffusion element 32 can output the blue laser light and the red laser light in time sequence based on transmitting at least the blue laser light and the red laser light in time sequence by its rotation, therefore it can be configured to output the three primary colors for the light source system. The second diffusion element 32 and the first diffusion element 31 form the speckle dissipation system of the laser light source in the embodiments of the disclosure.

The light bar 6 collects the lights of three primary colors to transmit them into a light machine part, so as that the laser light source providing illumination for the light machine part is realized.

In the embodiments of the disclosure, since the blue laser light and the red laser light pass the first diffusion element and the second diffusion element of the speckle dissipation system 3 in order, two diffusion elements within which one is fixedly disposed and the other is moving can be used at the same time to dissipate speckles for the blue laser light and the red laser light. The technical problem of low display quality of the projected images brought by the speckle effect is solved when a dual-color laser light source is used; in addition the blue laser light and the red laser light can be output in time sequence and used to provide the light source system with three primary colors.

Figure 2:
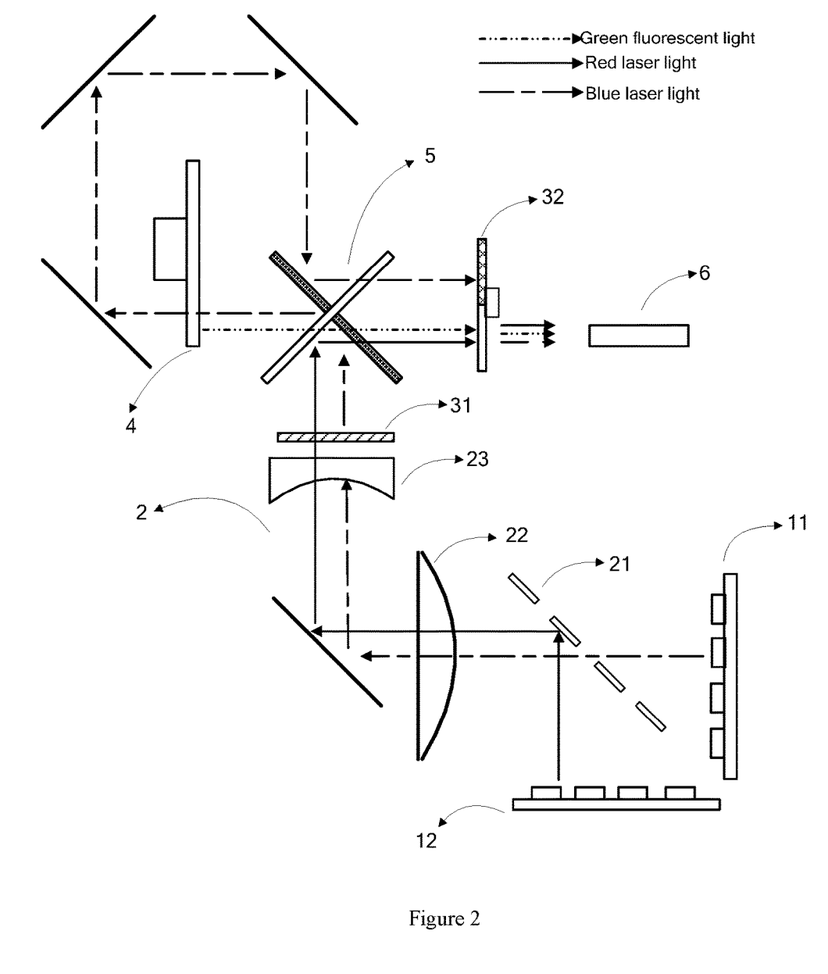
FIG. 2 shows a schematic diagram of another dual-color laser light source in some embodiments of the disclosure.

The embodiments of the disclosure provides another laser light source. As shown in FIG. 2, the blue laser emitter array 11 being configured to output the blue laser light is arranged vertical to the red laser emitter array 12 being configured to output the red laser light, and the beams emitted by the vertically arranged arrays are also vertical to each other. This kind of arrangement helps to reduce the volume occupied by the laser light devices, at the same time helps to the commonly use of the beam shaping device.

The laser light spot emitted by the laser emitter may have uneven luminance and too big beam area, in turn result in many problems such as low light transmittance of the optical components and low efficiency of fluorescent excitation, as well as low collection efficiency resulted by the radial angle of the laser beam being greater than the collection angle of the light bar to influence the luminance of the light source for projection. Hence the beam shaping of reflection, refraction, etc. for the laser light is required to reduce the beam area and homogenize the beam energy. The laser beam can be used for illumination only after being beam shaped, as well as for the subsequent fluorescent excitation by the fluorescent wheel.

The first diffusion element is fixedly disposed at the rear end of the beam shaping optical path(s) of the blue laser light and the red laser light, and is configured to diffuse the blue laser light and the red laser light. As shown in FIG. 2, the beam shaping device 2 comprises a reflector element 21, a convex lens 22 and a concave lens 23, and the beam shaping device 2 also comprises a first diffusion element 31 behind the concave lens. The first diffusion element is fixedly disposed. The convex lens 22 and the concave lens 23 form a telescope system. The beam shaping device performs the shaping of reflection, beam bunching and homogenization in order for the blue laser light and the red laser light.

The reflector element 21 is arranged in front of the blue and the red laser emitter arrays and is arranged at an included angle of 45° with the two laser light arrays. The reflector element 21 can be composed by a set of reflectors at intervals, the lens part of the reflectors can reflect one light source, the interval between the reflectors can allow to transmit another light source. Accordingly, the reflection for one light source of the blue and the red laser light sources and the transmission for the other light source only by using one reflector element, so that it not only can reduce the beam separation of the beams output by the two laser light arrays and output the synthetic beam in the same direction, it can also reach the object of compact structure.

Before reaching the reflector element 21, the blue laser light and the red laser light also passes a collimating lens (not shown in the figure) for collimation to reduce the angle of diffusion for the laser light respectively, so that more quantity of light can reach or transmit through the reflector element to improve the shaping efficiency of the laser light.

After beam combination by the reflector element 21, the blue laser light and the red laser light pass through the telescope system composed of the convex lens 22 and the concave lens 23 in order, the telescope system here is configured to bunch the laser beam, reduce the size of the light spot or the beam area, and improve the transmittance of the beam in the optical devices at the rear end.

After passing the telescope system, the blue laser light and the red laser light pass through and shot out from the first diffusion element 31 for a first diffusion, wherein the blue laser light incidents into the fluorescent wheel 4 after transmitting the first diffusion element 31, and the red laser light incidents into a light merging component 5 after transmitting the first diffusion element 31. No matter for the red laser light or the blue laser light, the first diffusion element will diffuse the laser beams. On the one hand, it can increase the spacial phases of the laser beams and destroy to a certain extent the constant phase which is the condition for producing interference, and the purpose of certain speckle dissipation can be achieved; on the other hand, the diffusion of the laser beams can also homogenize the beam energy, which is very important for the blue laser light, since the blue laser light serves as the excited light of the fluorescence wheel. And if the blue laser beam is not homogenized, it may cause that the surface of the fluorescence wheel is burned out and damaged by the laser beam with more centralized light intensity when the laser light directly incident on the surface of the fluorescence wheel under uneven intensity distribution and centralized energy, the burning out and the damaging will result in that the fluorescence wheel is unable to normally excite the fluorescent light.

To dispose the first diffusion element 31 at the rear end of the beam shaping optical path(s), it is considered that the laser beam has a small light spot area through bunching, thus it is favorable for transmitting the laser beam into the optical system below through the optical lens, and at that time the diffusion efficiency of the laser beam can be improved. At the same time, in order to achieve the condition for exciting the fluorescence wheel when the laser light incidents into it, the last homogenization of the light spot must be performed for the uniform distribution of energy.

Specifically, the first diffusion element 31 may be a diffusion plate, on the surface thereof diffusers may be coated in uniform distribution. Frosted glass or two-dimensional components can be chosen, which can produce diffuse reflection for light and destroy the directionality of the laser light. Microstructures may also be manufactured on the surface of the diffusion plate, which may play the same effect of diffuse reflection.

Figure 3:
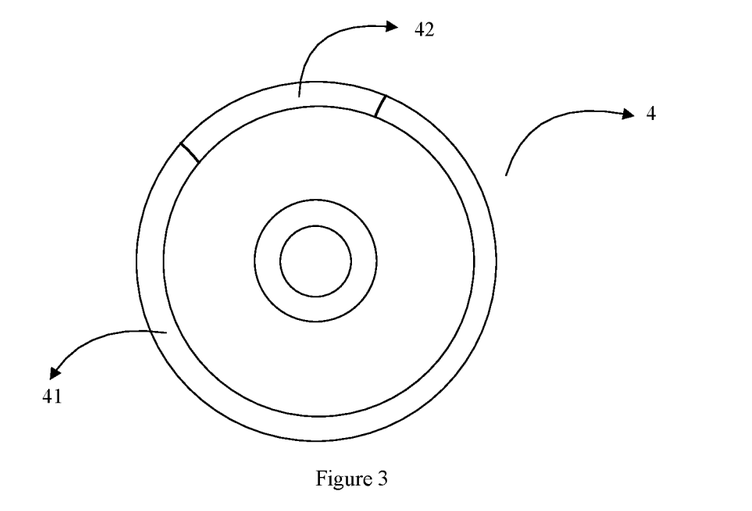
FIG. 3 shows a schematic diagram of the plan view of a fluorescence wheel in some embodiments of the disclosure.

An image is composed of three primary colors of red, green and blue. In the embodiments of the disclosure, the laser lights have already could provide two primary colors of blue and red, and a wavelength converter is also required to produce one color of three primary colors, that is, green. A fluorescent wheel is a normally used wavelength converter, which has a shaft and can be driven by the motor to rotate. As shown in FIG. 3, the fluorescence wheel 4 comprises a reflection part 41 and a transmission part 42, and the transmission part 42 is used for transmitting the excitation light. According to the principle that a light of a short wavelength can excite a light of a long wavelength, the blue laser light is selected as the excitation light. The surface of the reflection part 41 is coated with green powder. The reflection part 41 and the transmission part 42 are alternately in the position into which the excitation light source incidents when the fluorescent wheel 4 rotates. Accordingly, when the laser light incidents into the surface of the fluorescence wheel, it can not only transmit a portion of the laser light, but can also be excited by another portion of the laser light to emit the fluorescent light. When the fluorescence wheel 4 rotates to the position of the reflection part 41, the blue laser light irradiates the green fluorescent powder to emit the green fluorescent light which is reflected by the surface of the fluorescence wheel 4 to reach the light merging component 5. When the fluorescence wheel rotates to the position of the transmission part 42, the transmission part can be transparent glass, the blue laser light will transmit the transmission part 42 and then return to the light merging component 5 from the back of the fluorescence wheel 4 through the loop of the blue laser light, and the loop of the blue laser light is usually composed of relay lenses and reflectors.

In some embodiments of the disclosure, a collimating lens set can be arranged on the front/back of the fluorescence wheel 4 and used for reducing the angles of diffusion for the transmitted laser light or reflected fluorescent light and enhancing the degree of beam convergence.

The red laser light after beam shaping transmits the first diffusion plate and then directly incidents into the light merging component 5. And in the embodiments of the disclosure, the light merging component 5 can choose an X light merging lens.

The X light merging lens is composed of two lenses crossly arranged in an "X" shape, which has a color selection effect of reflecting A light and transmitting B light or reflecting B light and transmitting A light respectively through applying coatings on its surface. For example, a lens for reflecting red laser light and transmitting green fluorescent light, or a lens for reflecting green fluorescent light and transmitting red laser light and blue laser light, and the high reflectance and high transmittance of light can be realized by applying reasonable coatings on the light merging lens and keeping the light away from the area with low transmittance in the center of the lens as much as possible in the design of the optical path.

In the embodiments of the disclosure, the X light merging lens 5 is composed of a lens for reflecting blue and transmitting red and green and a lens for reflecting red and transmitting blue and green, wherein, the lens for reflecting red and transmitting blue and green can reflect the red laser light and transmit the blue laser light, the transmitted blue laser light is then reflected by another lens for reflecting blue and transmitting red and green to the fluorescence wheel, finally it returns to the X light merging lens 5 after being conversed in a series of optical path conversions and then is reflected by the lens for reflecting blue and transmitting red and green in the X light merging lens 5. Whereas, the excited green fluorescent light is reflected by the fluorescence wheel to the X light merging lens 5 and is transmitted by both the lens for reflecting red and transmitting blue and green and the lens for reflecting blue and transmitting red and green of the X light merging lens 5. And the red laser light is firstly reflected by the lens for reflecting red and transmitting blue and green, then reaches and transmits the lens for reflecting blue and transmitting red and green. The transmission path of the three colors of light in the X light merging lens is as shown by the optical path in FIG. 2. Finally, the red laser light, the blue laser light and the green fluorescent light all pass the X light merging lens 5 to form a white light and transmit in the same direction.

Figure 4:
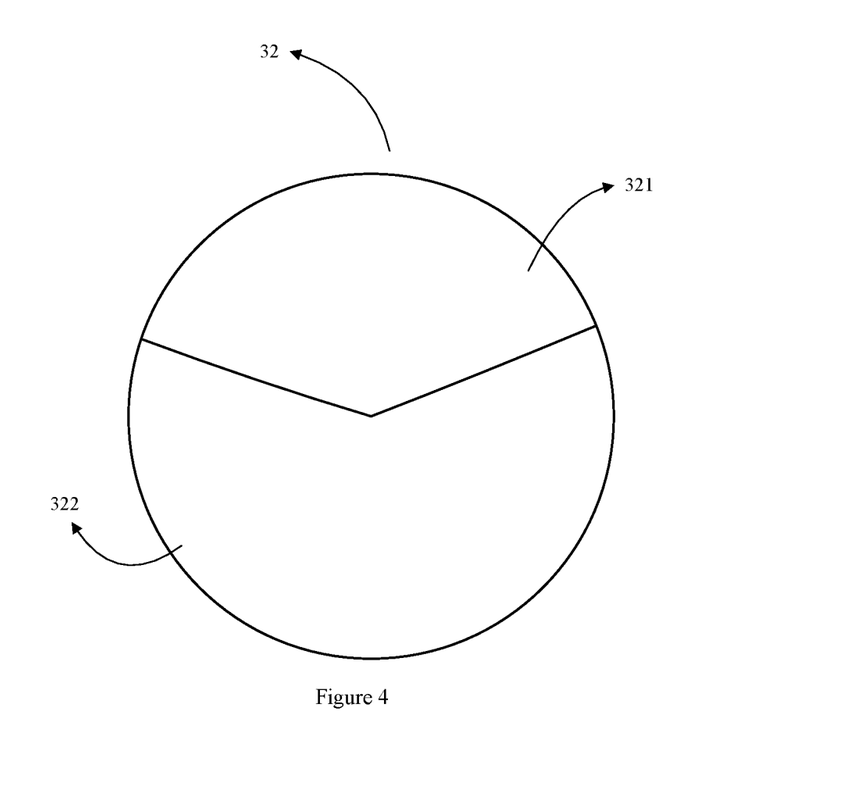
FIG. 4 shows a schematic diagram of a second diffusion plate in some embodiments of the disclosure.

In order for more effective speckle dissipation for the laser light, the laser light and the fluorescent light also passes the second diffusion element 32 of the speckle dissipation system. The second diffusion element 32 can be controlled to rotate by a motor. Specifically, the second diffusion element 32 may be a structure of a color wheel. As shown in FIG. 4, the color wheel comprises a diffusion zone 321 being configured to transmit the blue laser light and the red laser light and a non-diffusion zone 322 being configured to transmit the green fluorescent. The diffusion zone and the non-diffusion zone are spliced to form the wheel face of the color wheel.

Figure 5:
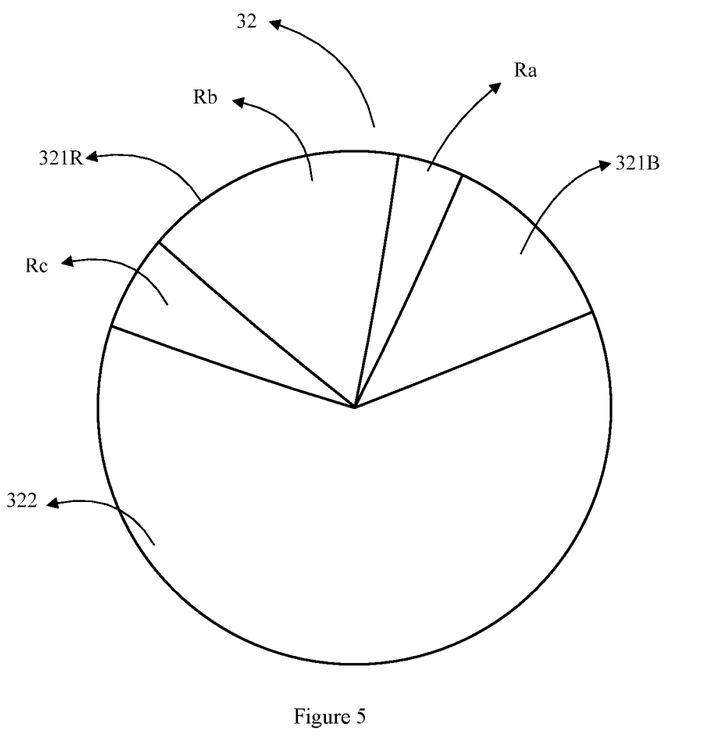
FIG. 5 shows a schematic diagram of the zones of another second diffusion plate in some embodiments of the disclosure.

The diffusion zone 321 may be made of diffusion material and on the surface thereof diffusers may be coated or microstructures may be manufactured. In order to diffuse the blue laser light and the red laser light respectively, the diffusion zone 321 is divided into a blue laser light diffusion zone 321B and a red laser light diffusion zone 321R, as shown in FIG. 5, which are configured to transmit the blue laser light and the red laser light in time sequence when the second diffusion element rotates.

The non-diffusion zone 322 may be a green color filter plate or may be transparent material, such as transparent glass, and is configured to transmit and guide the green fluorescent light into the light bar 6 for homogenization. The second diffusion element plays a role of outputting the green fluorescence light as a color filter when the non-diffusion zone 322 is a green color filter plate, hence the color purity of green fluorescence light will be improved.

The fan-shaped areas or the central angles occupied by the blue laser light diffusion zone 321B and the red laser light diffusion zone 321R on the color wheel are usually different when considering the proportion of red and blue needed in the white balance of the light source system, therefore the coated areas of the diffusers on these two diffusion zones are also usually different. For example, in the embodiments of the disclosure, three central angles of zones corresponding to red, green and blue account for 15%, 25% and 60%, respectively. Specifically, the central angle of the blue laser light diffusion zone 321B is 54°, the central angle of the red laser light diffusion zone 321R is 90°, and the central angle of the non-diffusion zone is 216°. The above center angle distribution of the color wheel for the red laser light diffusion zone, the blue laser light diffusion zone and the non-diffusion zone on the second diffusion element is just an example, the color proportions of R, G and B are related with the white balance required by the light source system, which will be not limited to the above numerical range. The white balance is an indicator for describing the accuracy of the white color obtained by merging the three primary colors of red, green and blue in a display device. The white balance will be affected by the factors of color temperature, ambient light, etc., and different white balances will display different image tones. Moreover, in the above embodiment, if the system has serious speckling phenomenon, it is necessary to reduce the angle of the non-diffusion zone and increase the angle of the diffusion zone, and the diffusion zone of a big angle is used to weaken the speckling phenomenon.

Figure 6:
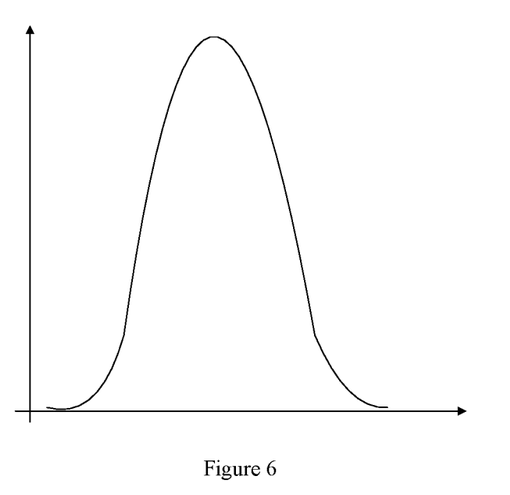
FIG. 6 shows a schematic diagram of the Gaussian distribution of the laser beam energy in some embodiments of the disclosure.

Although the blue laser light and the red laser light have close coherence, owing to the different sensitivity of human eyes to the speckles formed by the red laser light and the blue laser light, the actual situation is that human eyes have higher sensitivity to the speckles formed by the red laser light, and thus more attentions shall be paid to the speckle dissipating of the red laser light. The red laser light diffusion zone 321R may comprise multiple diffusion subzones; the multiple diffusion subzones have different angles of diffusion for the red laser light. Among the multiple diffusion subzones, the angles of diffusion for the red laser light of the diffusion subzones in the middle can be greater than the angles of diffusion for the red laser light of the diffusion subzones on both sides, and the areas of the diffusion subzones in the middle are also bigger than the areas of the diffusion subzones on both sides; the reason for such arrangement is considering that energy distribution of the laser light is of the Gaussian type, and as shown in FIG. 6, the energy of the laser beam is more centralized in the middle. As a result, the diffusion zones closer to the middle requires for greater angle of diffusion and bigger area proportion to effectively diverge the laser beam with more centralized energy.

As shown in FIG. 5, the red laser light diffusion zone is divided into 3 red laser light diffusion subzones, Ra, Rb and Rc, wherein, the fan-shaped central angle is 45° for Rb, 20° for Ra and 25° for Rc. The angle of diffusion for the diffuse reflector at Rb can be set as 5°~5.5°, the angle of diffusion for the diffuse reflector at Ra can be set as 2°~2~0.5°, and the angle of diffusion for the diffuse reflector at Rc can be set as 2.5°~3°, the gradual arrangement owing to such settings of the diffusion subzones of the red laser light diffusion zone can realize the effective decoherence for the Gaussian beams of the laser light.

In this embodiment, the work process of the speckle dissipation of the laser light is that: according to the lighting sequence of the laser emitters, when the blue laser emitter is lighted, the blue laser light after beam shaping transmits the first diffusion element 31 to realize the preliminary decoherence and homogenization, and is reflected by the X light merging lens 5 to the fluorescence wheel 4, and is transmitted by the transmission part 42 of the fluorescence wheel when the fluorescence wheel 4 rotates to the position of the transmission part 42, and then is converted by the optical path of the relay loop to reach the X light merging lens 5 for reflection and output again. At that moment, the second diffusion element 32 rotates to the position of the blue laser light diffusion zone 321B, so that the blue laser light is diffused by the moving diffusion element and then output to form the blue laser light. When the fluorescence wheel 4 rotates to the reflection part 41, the blue laser light irradiates the green fluorescent powder in the circumference on the surface of the reflection part 41, the emitted green fluorescent light is reflected by the fluorescence wheel and transmitted and output through the X light merging lens 5. At that moment, the second diffusion element 32 rotates to the position of the non-diffusion zone 322, such as a green color filter, so that the color filter wheel 7 rotates to the position of the green light filter plate, so that the green fluorescent light transmits the green color filter of the moving second diffusion element 32 to form the green light by colors being filtered.

In the similar way, when the red laser emitter is lighted, the red laser light through the beam shaping device transmits the first diffusion element 31 to realize the preliminary decoherence, it reaches the X light merging lens and is reflected by it. At that moment, the second diffusion element 32 rotates to the position of the red laser light diffusion zone 321R, the red laser light will pass through Ra, Rb and Rc in order along with the rotation of the red laser light diffusion zone 321R, the red laser light suffers another diffusion, so that the red laser light is diffused by the red laser light diffusion zone 321R and then output to form the red laser light.

In the technical solution of embodiments within which a dual-color laser light source is provided, the blue laser light emitted by the blue laser emitter and the red laser light emitted by the red laser emitter firstly pass the fixedly disposed first diffusion element 31, which is diffusion material and can increase the spacial phases of the blue laser beam or the red laser beam and destroy to a certain extent the constant phase which is the condition for producing interference. After merging with the fluorescent light, the blue laser light and the red laser light pass the moving second diffusion element 32, which is diffusion material, since the moving diffusion element itself can produce some random spatial phases for the laser beam compared with the fixedly arranged diffusion element, and accordingly it can effectively destroy the coherence of the laser light; whereas, in the embodiment of the disclosure, the moving diffusion element can further increase more random phases on the basis of the spatial phases increased by the fixed diffusion element by matching the fixed diffusion element with the moving diffusion element, so that the degree of decoherence for the blue laser beam and the red laser beam will be higher, more independent speckle patterns can be formed on the projected image, however, the more the independent speckle patterns are, the weaker the phenomenon of light and shade spots will be by using the integral action of human eyes, and accordingly the speckle effect of the laser light can be effectively weakened to improve the display quality of projected images.

Besides, the embodiment of the disclosure also divides the red laser light diffusion zone in the second diffusion element into multiple diffusion subzones according to the characteristic that human eyes are more sensitive to the speckles of the red laser light, and the diffusion subzones in the middle have both bigger areas and greater angles of diffusion for the red laser light than the diffusion subzones on both sides, so that the speckle dissipation effect on the red laser light can be enhanced according to the characteristics of Gaussian distribution of the laser beams.

Besides, in the embodiment of the disclosure, the second diffusion element is a structure of a color wheel, and comprises a diffusion zone and a non-diffusion zone. The diffusion zone and the non-diffusion zone are spliced to form the wheel face of the color wheel. The diffusion zone and the non-diffusion zone are spliced to form the wheel face and output the blue laser light, the red laser light and the green light in time sequence when the color wheel rotates, that is, output the three primary colors in time sequence, therefore the second diffusion element has both the functions of dissipating speckles for the laser light source and outputting three primary colors for the light source system, then the usage of a color filter wheel can be omitted and the utilization of the optical components in the light source system can be improved, and the light source system architecture is advantagely to be simplified.

Moreover, in the embodiment of the disclosure, a speckle dissipation system being composed of the first diffusion element and the second diffusion element is shared for the speckle dissipation of the blue laser light and the red laser light, rather than to design the optical path of speckle dissipation for each of the laser light, the complexity of the optical path of the light source is reduced, and the efficiency of the speckle dissipation is improved.

Figure 7:
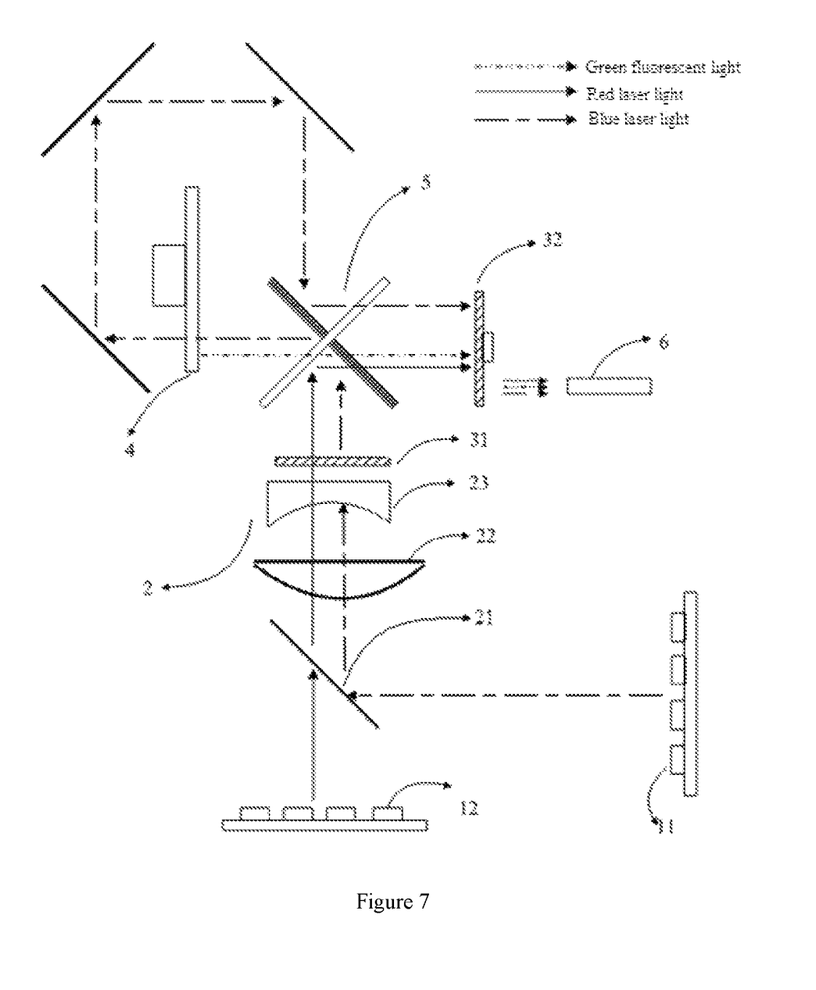
FIG. 7 shows a schematic diagram of yet another dual-color laser light source in some embodiments of the disclosure.

Similar to the laser light source illustrated by FIG. 2, the laser emitter in some embodiments of the disclosure as shown in FIG. 7 comprises a blue laser emitter array 11 and a red laser emitter array 12. The blue laser light and the red laser light share a speckle dissipation system composed of a fixedly disposed first diffusion element 31 and a moving second diffusion element 32, so that the speckle effect of the blue and red laser lights can be weakened at the same time to achieve the speckle dissipation effect on the laser light source. The main differences between FIG. 7 and FIG. 2 are that the beam shaping devices used are different. Therefore, the same structures and functions as those in FIG. 2 will not be repeated, and the differences in FIG. 7 will be mainly described.

As shown in FIG. 7, the beam shaping device 2 comprises a reflector element 21, a convex lens 22, a concave lens 23, and a fixedly disposed first diffusion element 31 behind the concave lens. The convex lens 22 and the concave lens 23 form a telescope system. The beam shaping device performs the shaping of reflection, beam bunching and homogenization for the blue laser light and the red laser light in order.

The reflector element 21 is arranged in front of the blue and the red laser emitter arrays and is arranged at an included angle of 45° with the two laser light arrays. The reflector element 21 can be composed by a set of reflectors at intervals, the lens part of the reflectors can reflect one light source, the interval between the reflectors can allow to transmit another light source. In some embodiments of this disclosure, the reflector element 21 can be a dichroism sheet. Accordingly, the reflection for one light of the blue and the red laser lights and the transmission for another light only by using one reflector element, so that it not only can reduce the beam separation of the beams output by the two laser light arrays and output the synthetic beam in the same direction, it can also reach the object of compact structure.

In the state shown in FIG. 7, the reflector element 21 may transmit the red laser light emitted by the red laser array below it and reflect the blue laser light emitted by the blue laser array on its right.

The blue laser light and the red laser light may be merged by the reflector element 21 pass the telescope system composed of the convex lens 22 and the concave lens 23, and the first diffusion element 31 in order. This optical path and the optical path thereafter are the same as those in FIG. 2, and the details will not described herein again.

Figure 8:
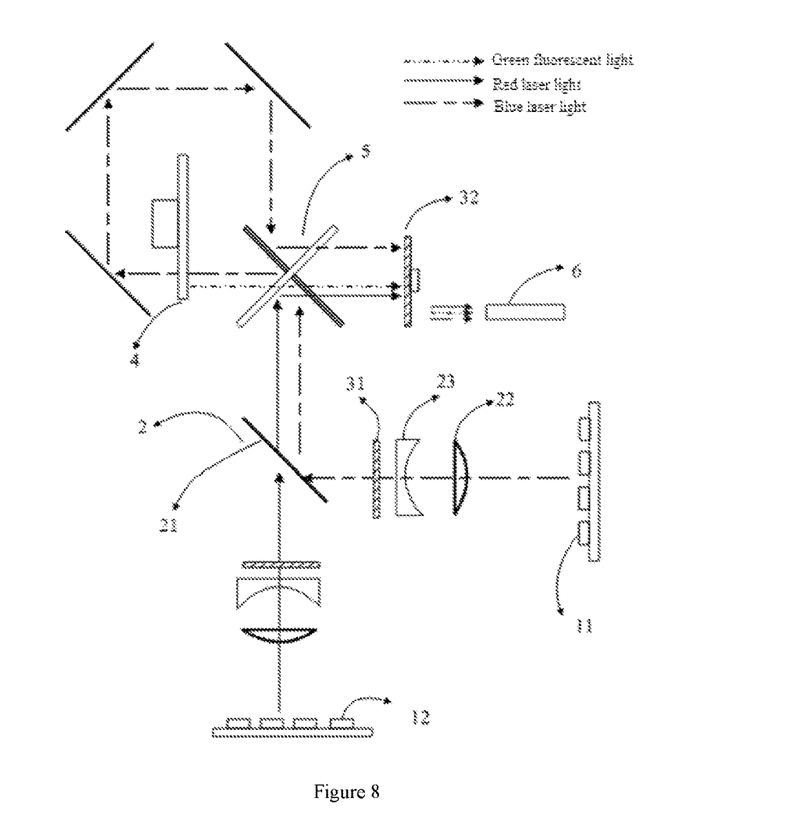
FIG. 8 shows a schematic diagram of yet another dual-color laser light source in some embodiments of the disclosure.

As shown in FIG. 8, another laser light source is provided in some embodiments of the disclosure. The main differences between FIG. 8 and FIG. 2 are also that the beam shaping devices used are different. Therefore, the same structures and functions as those in FIG. 2 will not be repeated, and the differences in FIG. 8 will be mainly described.

As shown in FIG. 8, the beam shaping device 2 comprises a reflector element 21, two convex lenses 22, a concave lenses 23, and a fixedly disposed first diffusion element 31 behind each of the concave lens. Each of the convex lens 22 and the corresponding concave lens 23 form a telescope system. The beam shaping device in FIG. 8 performs the shaping of beam bunching, homogenization and reflection in order for the blue laser light and the red laser light, which is different from the shaping of reflection, beam bunching and homogenization performed in FIGS. 2 and 7 for the blue laser light and the red laser light in order.

In the laser light source illustrated by FIG. 8, a telescope system and a fixedly disposed first diffusion element 31 behind the telescope system are arrange for each of the blue laser array 11 and the red laser emitter array 12. The blue laser light and the red laser light incident into the reflector element 21 after the shaping of beam bunching and homogenization performed by its corresponding telescope system and first diffusion element 31, respectively.

The reflector element 21 is arranged in front of its first diffusion element 31 and is arranged at an included angle of 45° with the two first diffusion elements 31. The reflector element 21 can be composed by a set of reflectors at intervals, the lens part of the reflectors can reflect one light source, the interval between the reflectors can allow to transmit another light source. Accordingly, the reflection for one light of the blue and the red laser lights and the transmission for another light only by using one reflector element, so that it not only can reduce the beam separation of the beams output by the two laser light arrays and output the synthetic beam in the same direction, it can also reach the object of compact structure.

In the state shown in FIG. 8, the reflector element 21 may transmit the red laser light emitted by the red laser array below it and reflect the blue laser light emitted by the blue laser array on its right.

The blue laser light and the red laser light may be merged by the reflector element 21 pass the fluorescence wheel 4 and the light merging component 5 in order. This optical path and the optical path thereafter are the same as those in FIG. 2, and the details will not described herein again.

Figure 9:
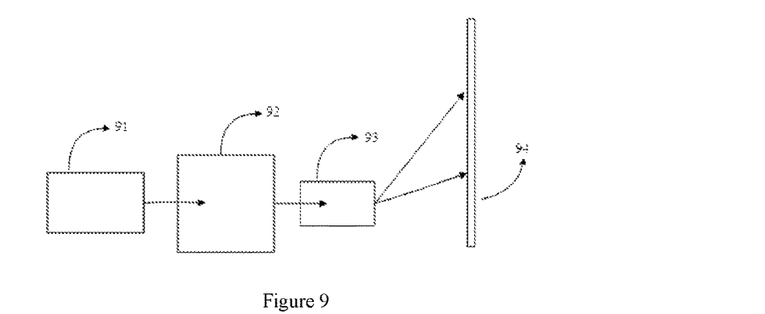
FIG. 9 shows a structural diagram of a projection display device in some embodiments of the disclosure.

Some embodiments of the disclosure provides a projection display device, as shown by the schematic diagram in FIG. 9, the projection display device comprises a laser light source 91, a light machine 92, a lens 93 and a projection screen 94.

The laser light source adopts the laser light source in the above embodiments, three primary lights sequentially output three primary colors; the primary colors enter the light machine 92 through the light bar (not shown in the figure), in addition to the light bar, the light machine 92 part also comprises an optical path converter and a DMD chip (both not shown in the figure). The DMD chip can be considered as being composed of numerous tiny reflectors, these tiny reflectors can turn over driven by current within a certain range of angle to regulate the quantity of light entering the lens, so that different colors can display on the images. After being modulated by the DMD, the three primary colors of light reach the lens 93 by refraction and convergence for multiple times.

The projection device in the embodiment is a projection device with ultra-short focus, it is applicable for household or portable use. Thus the lens 93 is a projection lens with ultra-short focus, and the projection lens with ultra-short focus has the characteristic that it can still project high-quality images at a low projection ratio. After being modulated by the DMD, the light reaches the lens 93 and is refracted and reflected by a set of optical lenses including multiple convex lenses, concave lenses, non-spherical lenses, etc. arranged within the lens 93, and then are finally projected on the projection screen 94 to form projected images.

Figure 10:
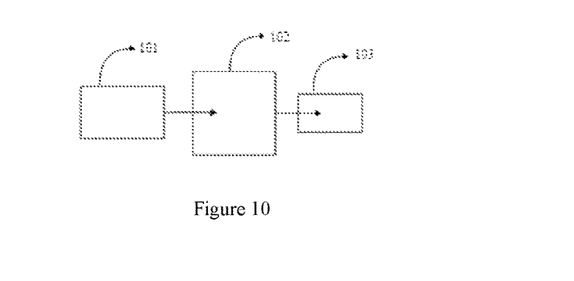
FIG. 10 is the structural diagram of another projection display device in some embodiments of the disclosure.

Some embodiments of the disclosure provides another projection display device, as shown by the schematic diagram in FIG. 10, the projection display device comprises a laser light source 101. According to FIGS. 2, 7 and 8, the laser light source 101 is a dual-color laser light source and comprises:

a blue laser emitter 11 configured to emit a blue laser light;

a red laser emitter array 12 configured to emit a red laser light;

a first diffusion element 31, which is fixedly disposed in optical path(s) of the blue laser light and the red laser light incidenting into a light merging component 5;

the light merging component 5 configured to transmit the blue laser light to a fluorescent wheel 4 and the red laser light to a second diffusion element 32;

the fluorescent wheel 4 configured to receive the blue laser light and emit a green fluorescent light which is transmitted to the second diffusion element 32 through the light merging component 5;

the second diffusion element 32, which is controlled to rotate and comprises a non-diffusion zone configured to transmit the green fluorescent light and a diffusion zone configured to transmit the blue laser light and the red laser light output by the light merging component.

In some embodiments of the disclosure, the first diffusion element 31 comprises two diffusion plates, wherein, one of diffusion plates is fixedly disposed in the red laser light optical path located between the red laser emitter array 12 and the light merging component 5, and the other diffusion plate is fixedly disposed in the blue laser light optical path located between the blue laser emitter array 11 and the light merging component 5.

The diffusion zone of the second diffusion element comprises a blue laser light diffusion zone configured to transmit the blue laser light and a red laser light diffusion zone configured to transmit the red laser light; the material of the blue laser light diffusion zone is a blue color filter plate provided with blue diffusion particles; the material of the red laser light diffusion zone is a red color filter plate provided with red diffusion particles; the non-diffusion zone is a green color filter plate.

In some embodiments of the disclosure, part of the blue laser light incidenting into the fluorescent wheel 4 being reflected back into the light merging component 5 and then being transmitted to the second diffusion element 32 through the light merging component 5;

As shown in FIG. 10, the projection display device further comprises a light conduit 102 and an image-forming component 103. The light conduit 102 is disposed in the light emitting direction of the second diffusion element. The image-forming component 103 is configured to form a projected image based on an image been inputted and the light emitted by the light conduit.

The laser light source 101 provides three primary lights which sequentially output three primary colors, and then the primary colors enter the light conduit 102. Based on the light emitted by the light conduit 102 and an image been inputted, a projected image can be formed by the image-forming component 103.

The image-forming component 103 may be a DMD (Digital Micromirror Device) element or a LCOS (Liquid Crystal on Silicon) element.

For the projection display devices provided by the disclosure, the moving diffusion part can further increase more random phases on the basis of the spatial phases increased by the fixed diffusion part by matching a fixedly arranged diffusion part with a moving diffusion part of the laser light source part to jointly realize the speckle dissipating for laser light, so that the degree of decoherence for the original laser beam will be higher, more independent speckle patterns can be formed on the projected image, however, the more the independent speckle patterns are, the weaker the speckle effect will be by using the integral action of human eyes, and accordingly the speckle effect of the laser light can be effectively weakened.

In the projection display devices provided by the technical solution of the disclosure, the laser light source can realize the effective speckle dissipating for the laser light by using two diffusion parts, it has fewer optical devices, simple structure and low complexity of optical architecture, it is favorable for the miniaturized design of the optical system, and at the same time, it also provides conditions for the miniaturized design of projection devices.

Although the preferable embodiments of the disclosure have been described, but the skills in the art can make other changes and modifications for these embodiments once they know the basic creative ideas. Therefore, the attached claims can be explained to comprise the preferable embodiments and all the changes and modifications within the range of the disclosure.

Obviously, the skills in the art can make various changes and transformations of the disclosure without getting away from the spirit and range of the disclosure. In this way, if these modifications and transformations of the disclosure are within the range of the claims and their equivalent technologies of the disclosure, the disclosure is also intended to contain these modifications and transformations.

What is claimed is:

1. A dual-color laser light source, comprising:
 a blue laser device configured to emit a blue laser light;
 a red laser device configured to emit a red laser light;
 a fluorescent wheel including a surface coated with green fluorescent powder excitable by the blue laser light to emit a green fluorescent light; and a speckle dissipation system comprising:
  a first diffusion element fixedly disposed in a first beam shaping optical path of the blue laser light and a second beam shaping optical path of the red laser light, wherein the first diffusion element is configured to diffuse the blue laser light and the red laser light; and
  a second diffusion element controlled to rotate and disposed in front of the blue laser light, the red laser light, and the green fluorescent light incidenting into a light bar, wherein the second diffusion element is configured to transmit at least the blue laser light and the red laser light in time sequence and output the blue laser light and the red laser light.

2. The dual-color laser light source according to claim 1, wherein the first diffusion element is a first diffusion plate.

3. The dual-color laser light source according to claim 1, wherein the first diffusion element is disposed at a rear end of the first beam shaping optical path and a rear end of the second beam shaping optical path;
  wherein the blue laser light incidents into the fluorescent wheel after transmitting the first diffusion element; and
  wherein the red laser light incidents into a light merging component after transmitting the first diffusion element.

4. The dual-color laser light source according to claim 1, wherein the second diffusion element comprises:
  a diffusion zone configured to transmit the blue laser light and the red laser light; and
  a non-diffusion zone configured to transmit the green fluorescent.

5. The dual-color laser light source according to claim 4, wherein the diffusion zone of the second diffusion element is comprised of a diffusion material and coated with diffusers on the surface thereof.

6. The dual-color laser light source according to claim 4, wherein the non-diffusion zone is a green color filter plate or is of transparent material, and is used to transmit the green fluorescent light which will incident into the light bar.

7. The dual-color laser light source according to claim 4, wherein the diffusion zone of the second diffusion element comprises a blue laser light diffusion zone and a red laser light diffusion zone, wherein both the blue laser light diffusion zone and the red laser light diffusion zone are configured to transmit the blue laser light and the red laser light in time sequence when the second diffusion element rotates.

8. The dual-color laser light source according to claim 7, wherein the red laser light diffusion zone comprises multiple diffusion subzones, and the multiple diffusion subzones have different angles of diffusion for the red laser light.

9. The dual-color laser light source according to claim 8, wherein among the multiple diffusion subzones, the angles of diffusion for the red laser light of the diffusion subzones in the middle are greater than the angles of diffusion for the red laser light of the diffusion subzones on both sides.

10. The dual-color laser light source according to claim 8, wherein among the multiple diffusion subzones, a middle area of the diffusion subzones is bigger than either side areas of the diffusion subzones.

11. The dual-color laser light source according to claim 1, wherein before reaching the fluorescence wheel, the laser lights emitted by the laser devices pass a beam shaping device, and the beam shaping device comprises the first diffusion element.

12. The dual-color laser light source according to claim 11, wherein the beam shaping device comprises one reflector element, one convex lens and one concave lens, and one first diffusion element;
  wherein one laser light of the blue and red laser lights is reflected by the reflector element and the other laser light is transmitted by the reflector element; and
  wherein the blue laser light and the red laser light reach the first diffusion element after passing the reflector element, the convex lens, and the concave lens in order.

13. The dual-color laser light source according to claim 11, wherein, the beam shaping device comprises one reflector element, two convex lens, and two concave lens, and two first diffusion elements;
  wherein one convex lens and one concave lens, and one first diffusion element are provided corresponding to the blue laser device, the other convex lens and the other concave lens, and the other first diffusion element are provided corresponding to the red laser device;
  wherein the blue laser light and the red laser light reach the reflector element after passing its convex lens and concave lens, and its first diffusion element respectively; and
  wherein one laser light of the blue and red laser lights is reflected by the reflector element and the other laser light is transmitted by the reflector element.

14. The dual-color laser light source according to claim 1, wherein the first diffusion element comprises two diffusion elements fixed arranged separately; and
  wherein the blue laser light passes one of the first diffusion elements before reaching the fluorescence wheel, and the red laser light passes the other first diffusion element and then reach the second diffusion element.

15. A projection display device, comprising:
  a projection screen;
  a light machine;
  a lens; and
  a dual-color laser light source configured to provide illumination for the light machine, and images are projected to the projection screen by the lens for displaying, and wherein the dual-color laser light source comprises:
    a blue laser device configured to emit a blue laser light;
    a red laser device configured to emit a red laser light;
    a fluorescent wheel including a surface coated with green fluorescent powder excitable by the blue laser light to emit a green fluorescent light; and
    a speckle dissipation system comprising:
      a first diffusion element fixedly disposed in a first beam shaping optical path of the blue laser light and a second beam shaping optical path of the red laser light, wherein the first diffusion element is configured to diffuse the blue laser light and the red laser light; and
      a second diffusion element controlled to rotate and disposed in front of the blue laser light, the red laser light, and the green fluorescent light incidenting into a light bar, wherein the second diffusion element is configured to transmit at least the blue laser light and the red laser light in time sequence and output the blue laser light and the red laser light.

16. A projection display device, comprising:
  a blue laser emitter configured to emit a blue laser light;
  a red laser emitter configured to emit a red laser light;
  a first diffusion element fixedly disposed in a first optical path of the blue laser light and a second optical path of the red laser light and configured to direct the blue laser light and the red laser light to a light merging component;

wherein the light merging component is configured to transfer the blue laser light to a fluorescent wheel and transfer the red laser light to a second diffusion element;

wherein the fluorescent wheel is configured to receive the blue laser light and emit a green fluorescent light towards the second diffusion element through the light merging component; and wherein the second diffusion element is controlled to rotate and comprises:
a non-diffusion zone configured to transmit the green fluorescent light; and
a diffusion zone configured to transmit the red laser light outputted by the light merging component.

17. The projection display device according to claim 16, wherein the first diffusion element comprises two diffusion plates;
wherein a first diffusion plate is fixedly disposed in the red laser light optical path located between the red laser emitter and the light merging component; and
wherein a second diffusion plate is fixedly disposed in the blue laser light optical path located between the blue laser emitter and the light merging component.

18. The projection display device according to claim 16, wherein the diffusion zone of the second diffusion element comprises a blue laser light diffusion zone configured to transmit the blue laser light and a red laser light diffusion zone configured to transmit the red laser light;
wherein the blue laser light diffusion zone is comprised of a blue color filter plate provided with blue diffusion particles;
wherein the red laser light diffusion zone is comprised of a red color filter plate provided with red diffusion particles; and
wherein the non-diffusion zone is a green color filter plate.

19. The projection display device according to claim 16, wherein a portion of the blue laser light incidenting into the fluorescent wheel is reflected back into the light merging component and then transmitted to the second diffusion element through the light merging component; and,
the second diffusion element is also configured to transmit the blue laser light outputted by the light merging component.

20. The projection display device according to claim 16, further comprising a light conduit and an image-forming component;
wherein the light conduit is disposed in the light emitting direction of the second diffusion element; and
wherein the image-forming component is configured to form a projected image based on an image been inputted and the light emitted by the light conduit.

* * * * *

UNITED STATES PATENT AND TRADEMARK OFFICE
CERTIFICATE OF CORRECTION

PATENT NO. : 10,197,901 B2
APPLICATION NO. : 15/895803
DATED : February 5, 2019
INVENTOR(S) : Youliang Tian et al.

It is certified that error appears in the above-identified patent and that said Letters Patent is hereby corrected as shown below:

On the Title Page

<u>Item (57), Line 1, In the Abstract:</u>
Delete "Methods and apparatuses that provide a technical solution for handling a microphone operation request from more than one application is disclosed. The technical solution for processing data obtained by a microphone of a terminal device includes receiving an audio recording start command sent by a second application running on the terminal while the microphone is being used by a first application running on the terminal. The technical solution further includes assigning an unoccupied data receiving port to the second application, acquiring and broadcasting audio recording data collected by the microphone through a data sending port, receiving the audio recording data by the assigned data receiving port, and sending the audio recording data to the second application by the assigned data receiving port."

And replace with --A dual-color laser light source is disclosed that includes a blue laser device configured to emit a blue laser light, a red laser device configured to emit a red laser light, and a fluorescent wheel whose surface is coated with green fluorescent powder which is excitable by the blue laser light to emit a green fluorescent light. The dual-color laser light source may also include a speckle dissipation system including a first diffusion element and a second diffusion element.--

Signed and Sealed this
Fifth Day of May, 2020

Andrei Iancu
*Director of the United States Patent and Trademark Office*